United States Patent
Astrachan

(10) Patent No.: US 8,938,029 B2
(45) Date of Patent: Jan. 20, 2015

(54) DC REMOVAL FROM MULTICARRIER SIGNALS

(75) Inventor: Paul Astrachan, Austin, TX (US)

(73) Assignee: ViXS Systems, Inc., Toronto, Ontario (CA)

( * ) Notice: Subject to any disclaimer, the term of this patent is extended or adjusted under 35 U.S.C. 154(b) by 198 days.

(21) Appl. No.: 13/600,362

(22) Filed: Aug. 31, 2012

(65) Prior Publication Data

US 2014/0064418 A1    Mar. 6, 2014

(51) Int. Cl.
    *H04B 1/06*    (2006.01)
(52) U.S. Cl.
    USPC .......................................................... 375/319
(58) Field of Classification Search
    USPC .................................. 375/319, 224, 295, 326
    See application file for complete search history.

(56) References Cited

U.S. PATENT DOCUMENTS

| | | | |
|---|---|---|---|
| 2003/0133518 A1* | 7/2003 | Koomullil et al. | 375/326 |
| 2004/0082302 A1* | 4/2004 | Shippee | 455/127.1 |
| 2004/0264432 A1* | 12/2004 | Hori et al. | 370/343 |
| 2007/0002878 A1* | 1/2007 | Moorti et al. | 370/401 |
| 2008/0089443 A1* | 4/2008 | Sanada et al. | 375/319 |
| 2010/0260291 A1* | 10/2010 | Hou et al. | 375/319 |
| 2012/0163499 A1* | 6/2012 | Kim et al. | 375/298 |
| 2013/0089126 A1* | 4/2013 | Walker et al. | 375/224 |

* cited by examiner

*Primary Examiner* — Jaison Joseph
(74) *Attorney, Agent, or Firm* — Abel Law Group, LLP

(57) ABSTRACT

A receiver technique includes generating a DC offset compensation signal based on a frequency offset-compensated received signal and a frequency offset indication signal. The technique includes generating a DC offset-compensated received signal based on the DC offset compensation signal and a received signal. The frequency offset-compensated received signal may be generated using a first Coordinate Rotation DIgital Computer (CORDIC) responsive to the DC offset-compensated received symbol and the frequency offset indication signal. The DC offset compensation signal may be generated using a second CORDIC responsive to the frequency offset indication signal and a real-valued signal.

18 Claims, 3 Drawing Sheets

DC REMOVAL FROM MULTICARRIER SIGNALS

BACKGROUND

1. Field of the Invention

This application is related to communications systems and more particularly to receivers of multicarrier systems.

2. Description of the Related Art

A typical superheterodyne receiver first converts a received radio-frequency (RF) signal to an intermediate frequency and then demodulates the intermediate-frequency (IF) signal using synchronous detection driven by a local oscillator having a frequency that is substantially the same as the frequency of the carrier signal for the intended data signal. A typical zero-IF (i.e., homodyne, synchrodyne, or direct-conversion) receiver is a receiver in which the local oscillator frequency is the same as the frequency of the carrier signal, so that mixing results in conversion directly to baseband (i.e., zero frequency). That is, a zero-IF receiver converts a received RF signal to a baseband signal using a single frequency conversion. A typical zero-IF receiver is less complex than a superheterodyne receiver since it requires fewer frequency conversions than a superheterodyne receiver, eliminates intermediate frequency stages, and reduces image rejection issues. The reduced complexity of a zero-IF receiver results in compact digital signal processing code size, efficient digital signal processing data manipulation, and reduced integrated circuit area.

However, a typical zero-IF receiver introduces a DC offset into the received signal. For example, local-oscillator energy can leak through the mixer stage, feed back to the receiver antenna input, and then re-enter the mixer stage. As a result, the overall local oscillator energy self-mixes and creates a receiver DC offset signal. The receiver DC offset could be large enough to overload any baseband amplifiers and degrade the recovery of an intended data signal. Typical receiver modifications that reduce the receiver DC offset include high-pass filtering the received signal, which increases the complexity of the receiver. The increased complexity is associated with higher production costs that may outweigh the benefits. Accordingly, improved techniques for recovering an intended data signal from an RF signal in a zero-IF receiver are desired.

SUMMARY OF EMBODIMENTS OF THE INVENTION

In at least one embodiment of the invention, a method includes generating a DC offset compensation signal based on a frequency offset-compensated received signal and a frequency offset indication signal. The method includes generating a DC offset-compensated received signal based on the DC offset compensation signal and a received signal. Generating the DC offset compensation signal may include generating a first received signal measurement by integrating valid samples of the frequency offset-compensated received signal over a first interval of valid data of a first symbol time. Generating the DC offset compensation signal may include generating a second received signal measurement by integrating valid samples of the frequency offset-compensated received signal over a second interval of valid data of a second symbol time. Generating the DC offset compensation signal may include generating a first frequency correction value by integrating a complex exponential frequency correction signal over the first interval of valid data of the first symbol time. Generating the DC offset compensation signal may include generating a second frequency correction value by integrating the complex exponential frequency correction signal over the second interval of valid data of the second symbol time. The frequency offset-compensated received signal may be generated using a first Coordinate Rotation DIgital Computer (CORDIC) responsive to the DC offset-compensated received symbol and the frequency offset indication signal. The DC offset compensation signal may be generated using a second CORDIC responsive to the frequency offset indication signal and a real-valued signal.

In at least one embodiment of the invention, a receiver includes a DC offset compensation signal generator configured to generate a DC offset compensation signal based on a frequency offset-compensated received signal and a frequency offset indication signal. The receiver includes a DC offset compensation module configured to generate a DC offset-compensated received signal based on the DC offset compensation signal and a received signal. The DC offset compensation signal generator may include a first accumulator configured to generate a first received signal measurement based on valid samples of the received signal received during a first symbol time. The first accumulator may be further configured to generate a second received signal measurement based on valid samples of the received signal received during a second symbol time. The DC offset compensation signal generator may include a second accumulator configured to generate a first frequency correction value based on samples of a complex exponential frequency correction signal corresponding to the first symbol time. The second accumulator may be further configured to generate a second frequency correction value based on samples of the complex exponential frequency correction signal corresponding to the second symbol time. The DC offset compensation signal generator may include a calculation module configured to generate a quotient of a difference between the first and second received signal measurements divided by a difference between the first and second frequency correction values. The DC offset compensation signal generator may include a third accumulator configured to generate the DC offset compensation signal based on successive values of the quotient. The DC offset compensation signal generator may include a CORDIC configured to generate the complex exponential frequency correction signal based on a real-valued signal and the frequency offset indication signal.

BRIEF DESCRIPTION OF THE DRAWINGS

The present invention may be better understood by, and its numerous objects, features, and advantages made apparent to, those skilled in the art by referencing the accompanying drawings.

The use of the same reference symbols in different drawings indicates similar or identical items.

DETAILED DESCRIPTION

Figure 1A:
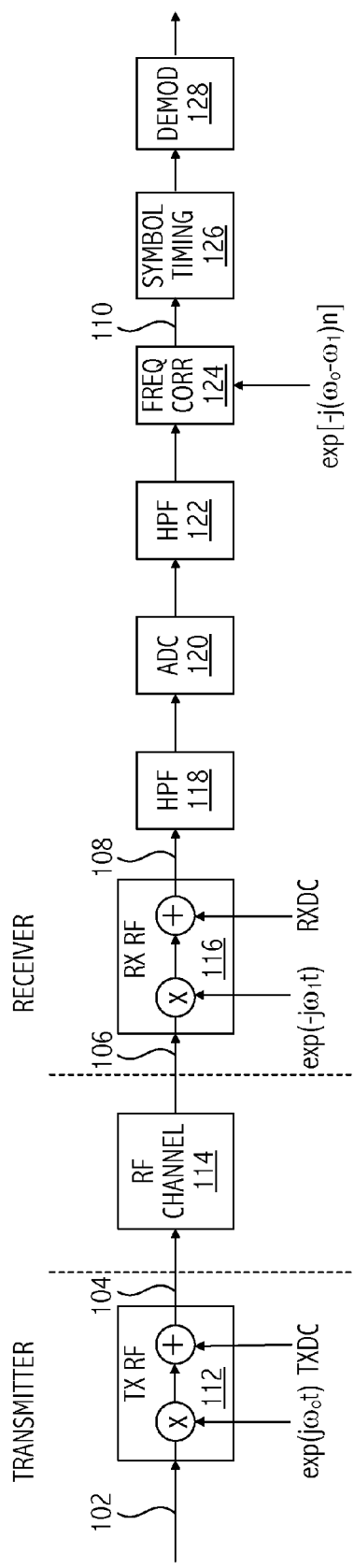
FIG. 1A illustrates a functional block diagram of a typical zero-IF communications system.
Figure 1B:
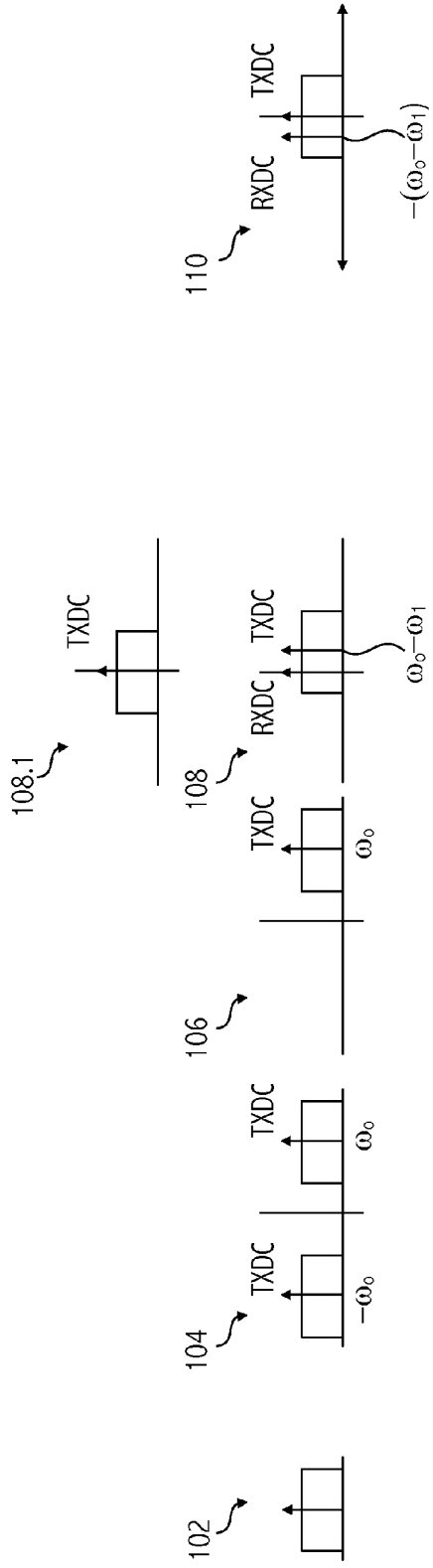
FIG. 1B illustrates exemplary frequency spectra associated with the zero-IF communications system of FIG. 1A.

Referring to FIGS. 1A and 1B, in a typical zero-IF system, radio-frequency (RF) transmitter 112 receives a baseband (i.e., zero frequency) multicarrier modulated signal 102 (e.g., a baseband orthogonal frequency-division multiplexing (OFDM) signal) for transmission over radio-frequency channel 114, which may be a wireline or wireless channel. As referred to herein, a baseband signal (i.e., a zero-frequency signal, e.g., multicarrier modulated signal 102) is a signal before mixing with a carrier signal (i.e., modulation of the carrier signal) or after demodulation of the carrier signal. Radio-frequency transmitter 112 frequency mixes baseband multicarrier modulated signal 102 with a transmitter carrier signal having a target frequency of $f_o=\omega_o/2\pi$, thereby introducing a DC error component, TXDC, into RF signal 104.

In a zero-IF receiver, RF receiver 116, frequency mixes received RF signal 106 with a receiver carrier signal having a frequency of $f_1=\omega_1/2\pi$ to recover the baseband multicarrier signal 108. In an ideal system, the local oscillators of the transmitter and receiver are matched and $\omega_o$ equals $\omega_1$. Radio-frequency receiver 116 ideally does not introduce any receiver DC error component, and provides signal 108.1. However, in a typical RF receiver, $\omega_o$, is slightly different from $\omega_1$, and RF receiver 116 introduces a receiver DC error component. The resulting baseband multicarrier signal includes a receiver DC error component and has a frequency offset of $\omega_0-\omega_1$, as illustrated by signal 108. Due to the frequency offset, the receiver DC error component does not reside at the same frequency as the transmitter DC error component. Subsequent frequency correction stages of the typical zero-IF receiver (e.g., frequency correction module 124) compensates for the frequency offset by frequency shifting the baseband multicarrier signal, thereby shifting the transmitter DC error component back to DC. However, the receiver DC error component will be shifted to a frequency of $-(\omega_0-\omega_1)$. Since the transmit DC error component resides at DC, it has a negligible effect on recovery of the intended data signal. For example, a typical OFDM modulator does not use the DC subcarrier (i.e., no data is allocated to the DC subcarrier). In addition, the communications system may suppress transmit carrier leakage as part of a transmitter calibration algorithm, thereby reducing any transmitter DC error component. Note that the receiver DC error component is not at zero frequency, but rather is offset from DC by a frequency offset that is the difference between the frequencies of the transmitter and receiver local oscillators, $-(\omega_0-\omega_1)$. The frequency offset multiplication makes the receiver DC error component a complex exponential (i.e., a rotating signal) that is difficult to measure.

The receiver DC error component can substantially affect data recovery. A typical receiver reduces the effect of the DC error component by applying a filtering scheme prior to a frequency correction technique to attenuate or eliminate the receiver DC error component. For example, the typical zero-IF receiver includes one or more high-pass filters (e.g., high-pass filters 118 and 122) before and/or after analog-to-digital converter 120 that ideally eliminate the receiver DC error component from zero frequency but leave in-band signals (e.g., a first subcarrier and any additional subcarriers of an OFDM signal) substantially unaffected. Such a filtering scheme ideally has a short impulse response to prevent adversely impacting burst timing. After high-pass filtering, frequency correction module 124 applies a frequency correction to the received signal, e.g., by multiplying the received signal by a frequency correction complex exponential, $\exp[j(\omega_0-\omega_1)n]$. The frequency offset, $\omega_0-\omega_1$, may be determined by measuring phase rotation of a carrier or by any other suitable technique. A typical frequency offset measurement technique determines the frequency offset based on a predetermined training signal received at the beginning of a data packet. The measured frequency offset may be refined using one or more pilot signals with known phase in the data portion of the packet. To perform frequency correction by multiplying the baseband multicarrier received signal by a complex exponential signal, frequency correction module 124 may use a hardware complex multiplier and/or software complex multiplier implementations executing on a signal processor to calculate trigonometric functions. Those techniques can be area-intensive and/or too slow for high-bandwidth applications.

In general, a multicarrier signal is generated from symbols including a cyclic prefix, which is a repeated portion of the multicarrier signal. For example, a transmitter repeats samples from the end of a symbol of the multicarrier signal at the beginning of the symbol. A typical receiver discards those cyclic prefix samples, which serve as a guard interval and allow linear convolution of a frequency-selective multipath channel to be modeled as a circular convolution that can be transformed to the frequency domain using a discrete Fourier transform. Symbol timing module 126 determines which samples are discarded and indicates or provides valid samples of the frequency corrected signal for demodulation by demodulator 128 (e.g., a fast Fourier transform (FFT) module) to generate a recovered data symbol that may be further processed by a receiver system.

Note that other modules may be included in a zero-IF receiver (e.g., gain modules, automatic gain control, or other suitable modules). In addition, note that the signals of FIG. 1B may be exaggerated as compared to signals in an actual system. For example, a typical frequency offset is substantially small and the receiver DC error component of signal 110 may reside between DC and a first carrier in an OFDM system. An exemplary system compliant with Institute of Electrical and Electronics Engineers 802.11a-1999— Supplement to IEEE Standard for Information Technology— Telecommunications and Information Exchange Between Systems—Local and Metropolitan Area Networks—Specific Requirements. Part 11: Wireless LAN Medium Access Control (MAC) and Physical Layer (PHY) Specifications: High-Speed Physical Layer in the 5 GHz Band can have a first carrier at 312.5 kHz and a receiver DC error component that is up to 40 parts-per-million (PPM), which for a 5.8 GHz carrier is approximately 230 kHz.

The output of high-pass filter 122 can result in a noisy DC term and/or the high-pass filter(s) may adversely affect nearby, low frequency carriers (e.g., the first few subcarriers of an OFDM signal), which may increase a receiver bit-error rate and reduce realizable data throughput of a zero-IF communications system. In addition, since the signal portion does not sum to zero across a symbol, demodulation of signal 110 using an FFT window may result in smearing of the receiver DC error component across data-carrying subcarriers, thereby decreasing a signal-to-noise ratio of the recovered signal and ultimately reduce system performance.

A technique for reducing or eliminating effects of the receiver DC error component on a received baseband signal includes generating a receiver DC offset compensation signal and applying that receiver DC offset compensation signal to a received signal prior to frequency offset correction. That is, the receiver DC offset is estimated before being offset from DC by any frequency offset correction. The receiver DC error estimate may be based on a first measurement of a first symbol of a frequency-corrected received signal and a second measurement of a second symbol of the frequency-corrected received signal. The receiver DC error estimate may be further based on first and second complex exponential signals that correspond to first and second frequency offset corrections applied to generate the first and second symbols, respectively. The receiver DC offset compensation signal may be generated based on the receiver DC offset estimate, as described further below.

Figure 2:
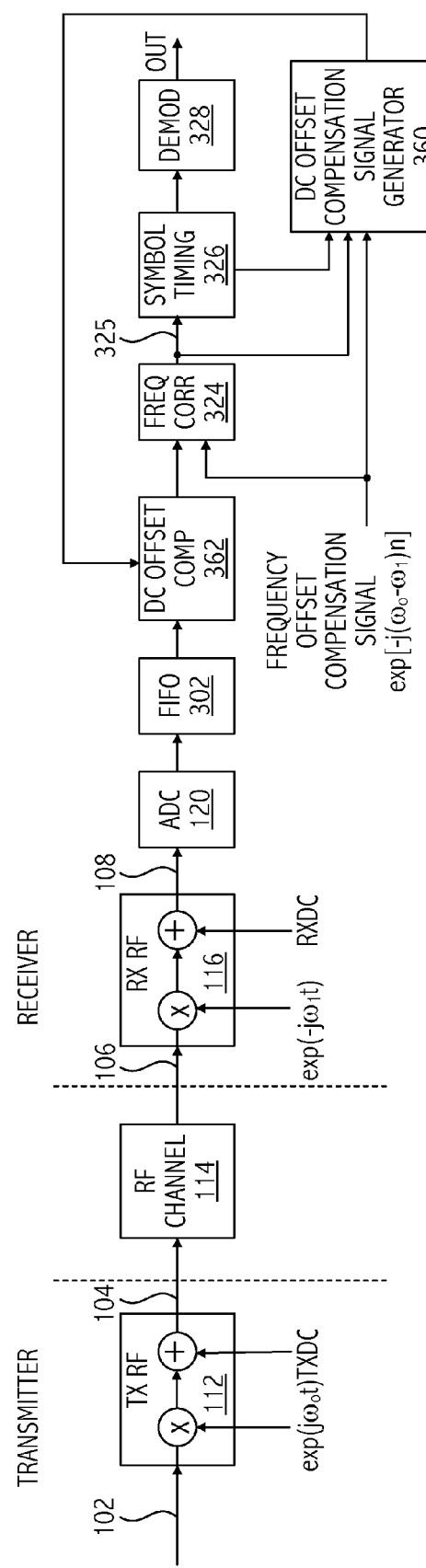
FIG. 2 illustrates an exemplary functional block diagram of a zero-IF receiver consistent with at least one embodiment of the invention.
Figure 3:
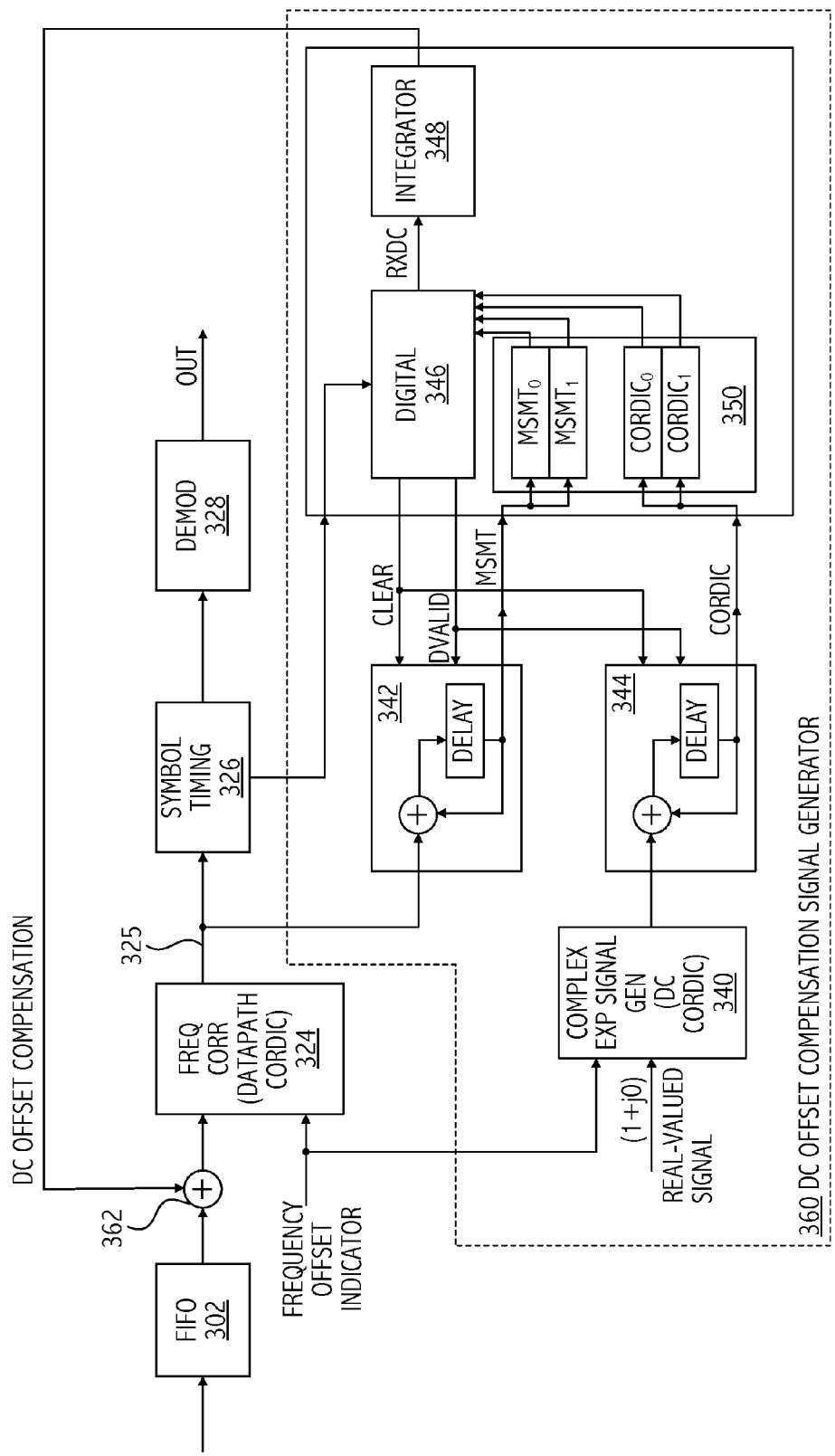
FIG. 3 illustrates a detailed diagram of portions of the zero-IF receiver of FIG. 2 consistent with at least one embodiment of the invention.

Referring to FIGS. 2 and 3, a receiver includes DC offset compensation module 362 and DC offset compensation signal generator 360. DC offset compensation signal generator 360 generates a DC offset compensation signal based on a frequency offset-compensated received signal generated by frequency correction module 324 and symbol timing information provided by symbol timing module 326. Note that in other embodiments, DC offset compensation signal generator 360 includes a separate frequency-correction module and generates the frequency offset-corrected signal using the received signal, and the frequency offset compensation signal. However, the receiver of FIGS. 2 and 3 reuses the frequency correction module of the receiver datapath for the DC offset compensation signal generation. In at least one embodiment, frequency correction module 324 includes a Coordinate Rotation DIgital Computer (CORDIC), which implements known techniques to perform calculations, including trigonometric functions and complex multiplies, without using a multiplier. The only operations a CORDIC requires are addition, subtraction, bit-shift, and table-lookup operations. CORDIC techniques may be used to rotate the phase of a complex number by multiplying the complex number by a succession of constant values that may be powers of two so that the rotation may be performed only using addition, subtraction, bit-shift, and/or table-lookup operations. A first iteration may rotate a vector, corresponding to an x coordinate and a y coordinate on the unit circle, in one direction or other by a predetermined amount (e.g., 45 degrees or 90 degrees), followed by successive iterations in one direction or other of decreasing step size, until a target angle is achieved. Each iteration corresponds to a multiplication of a vector and a rotation matrix, which is performed using addition, subtraction, bit-shift, and/or table-lookup operations. Frequency correction module 324 uses a CORDIC to generate a frequency-adjusted received signal by complex multiplication of samples of the received signal, which are complex numbers, with the frequency correction, which is a vector rotating at the frequency offset rate. The received samples are provided by storage element 302 (e.g., a FIFO storage element).

Referring to FIG. 3, DC offset compensation signal generator 360 measures first and second symbols of the frequency offset-compensated received signal 325. For each measurement, DC offset compensation signal generator 360 accumulates samples of the frequency offset-compensated received signal 325 across a symbol. However, since the frequency offset corrected signal is a multicarrier signal centered at DC that has substantially no frequency offset, the signal term ideally sums to approximately zero and the accumulated sum includes only the transmit DC error component and the receiver DC error component. The module discards the cyclic prefix samples for the measurements since it is preferable to measure only the signal portion, not the signal and cyclic prefix. This prevents measuring a DC term that is not caused by the RF receiver but rather is a function of the signal and should not be removed. For example, DC offset compensation signal generator 360 includes an integrator module 342, which accumulates only valid samples of the frequency offset-corrected signal, by summing a current sample with a sum of previous samples (e.g., stored in a delay element). A control circuit (e.g., digital module 346) generates a data valid signal that accounts for the cyclic prefix and indicates valid samples of the symbol. The measurement corresponding to a first symbol is stored in $MSMT_0$, which is a storage location of storage module 350. Storage module 350 may include a register file, random access memory, or other suitable storage element.

The first measurement of the first symbol may be described as follows:

$$MSMT_0 = \Sigma_{n=CP-1}^{N-1} \text{signal}[n] = RXDC_0 \Sigma_{n=CP-1}^{N}(\exp(-j(\omega_0-\omega_1)[n]) + TXDC_0.$$

Digital module 346 generates a control signal that resets integrator 342 (e.g., clears the delay element) at a symbol boundary. Then, DC offset compensation signal generator 360 generates a second measurement corresponding to a second symbol that may be described as follows:

$$MSMT_1 = \Sigma_{n=N+CP-1}^{2N-1} \text{signal}[n] = RXDC_1 \Sigma_{n=N+CP-1}^{2N-1}(\exp(-j(\omega_0-\omega_1)[n]) + TXDC_1.$$

The measurement of the second symbol is stored in a storage location $MSMT_1$.

In addition, DC offset compensation signal generator 360 generates a first frequency correction value and a second frequency correction value that correspond to those frequency correction values that were applied to the DC components of the first and second symbols, respectively, by frequency correction module 324. Those first and second frequency correction values are generated by multiplying a real-valued signal with the frequency correction complex exponential, $\exp[j(\omega_0-\omega_1)n]$, that was applied to the output of the analog-to-digital converter 320, initially (i.e., when the DC offset compensation signal has been initialized to be equal to zero), and, during steady-state, the DC offset-compensated output of the analog-to-digital converter 320. Receiver complex exponential generator 340 may include a second CORDIC that generates frequency correction values based on a real-valued signal (e.g., 1+j0) and the x or y coordinates corresponding to the frequency offset $\omega_0-\omega_1$, generated by the second CORDIC according to the frequency offset compensation signal. Integrator module 344 accumulates samples of the frequency offset compensation signal by summing a current frequency offset compensation sample with a sum of previous frequency offset compensation samples (e.g., stored in a delay element). The control signals generated by digital module 346 that account for the cyclic prefix and indicate valid samples of the symbol for calculating the first and second measurements are also used to integrate samples of the frequency offset compensation signals. The resulting accumulated values are stored at corresponding storage locations $CORDIC_0$ and $CORDIC_1$.

Since the transmitter and receiver DC error components are slowly-varying and do not change quickly, those components will be substantially unchanged from one symbol to a next symbol (i.e., $TXDC_0 = TXDC_1$ and $RXDC_0 = RXDC_1 = RXDC$). In other embodiments of DC offset compensation signal generator 360, $MSMT_1$ and $MSMT_0$ are not next sequential symbols of the frequency compensated received signal 325, but are close enough in time that transmit and receiver DC error components are substantially unchanged from the first symbol to the second symbol. DC offset compensation signal generator 360 generates the receiver DC error estimate based on $MSMT_1$, $MSMT_0$, $CORDIC_1$ and $CORDIC_0$. For example, digital module 346 generates the difference between the two measurements, which may be described as follows:

$$MSMT_1 - MSMT_0 = RXDC(\Sigma_{n=N+CP-1}^{2N-1}(\exp(-j(\omega_0-\omega_1)[n]) - \Sigma_{n=CP-1}^{N-1}(\exp(-j(\omega_0-\omega_1)[n])).$$

DC offset compensation signal generator 360 also generates the difference between the first and second corresponding complex exponential signals that may be described as follows:

$$CORDIC_1 - CORDIC_0 = (\Sigma_{n=N+CP-1}^{2N-1}(\exp(-j(\omega_0-\omega_1)[n]) - \Sigma_{n=CP-1}^{N-1}(\exp(-j(\omega_0-\omega_1)[n])).$$

Then, DC offset compensation signal generator 360 generates an estimate of the receiver DC error component by dividing the difference between the first and second measurements by the difference between the first and second frequency offset compensation signals. That is, the receiver DC error estimate may be described as follows:

$$RXDC = \frac{MSMT_1 - MSMT_0}{CORDIC_1 - CORDIC_0}.$$

Note that in other embodiments, DC offset compensation signal generator 360 estimates the receiver DC error by using other mathematically equivalent algorithms and/or by using different samples of a symbol of a frequency offset-compensated received signal.

In at least one embodiment, DC offset compensation signal generator 360 includes filter 348, which smooths the estimate of the receiver DC error component over a predetermined number of symbols, to generate a DC offset compensation signal that is applied to the received signal by DC offset compensation module 362 to reduce or eliminate the receiver DC error component from the received signal. DC offset compensation signal generator 360 may provide that receiver DC error estimate as the DC offset compensation signal that is applied to the received signal by DC offset compensation module 362 to reduce or eliminate the receiver DC error component. DC offset compensation module 362 may add or subtract the DC offset compensation signal from the output of FIFO 302, according to the sign of the polarity of the DC offset compensation signal, to thereby reduce or eliminate the receiver DC error component in the frequency-corrected received signal 325. Symbol timing module 326 indicates or provides only valid samples of a symbol of the frequency offset-compensated received signal to demodulator 328, which provides a recovered data symbol that may be further processed by a receiver system.

Note that the frequency offset may change over time. Accordingly, the frequency offset correction signal may be updated and provided to both frequency correction module 324 and receiver complex exponential signal generator 340. If there is no frequency offset (i.e., $\omega_0 = \omega_1$), the first and second frequency offset compensation signals will be equal and will result in a divide-by-zero. Accordingly, digital module 346 may bypass the DC offset compensation signal calculation for very small frequency offsets (e.g., approximately 6 ppm or less) and may set the DC offset compensation signal to a zero value. However, when there is no frequency offset, the transmitter and receiver DC error components combine at zero frequency and the data recovery is not affected by any receiver DC error. Thus techniques for reducing or eliminating effects of a receiver DC error component from a multicarrier signal in a multicarrier zero-IF receiver, without degradation from traditional high-pass filter techniques, have been disclosed.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an OFDM system, one of skill in the art will appreciate that the teachings herein can be utilized with other types of multicarrier systems. Variations and modifications of the embodiments disclosed herein may be made based on the description set forth herein without departing from the scope and spirit of the invention as set forth in the following claims.

What is claimed is:

1. A method comprising:
   generating a first received signal measurement by integrating valid samples of a frequency offset-compensated received signal over a first interval of valid data of a first symbol time;
   generating a second received signal measurement by integrating valid samples of the frequency offset-compensated received signal over a second interval of valid data of a second symbol time;
   generating a DC offset compensation signal based on the frequency offset-compensated received signal, a frequency offset indication signal, the first received signal measurement and the second received signal measurement; and
   generating a DC offset-compensated received signal based on the DC offset compensation signal and a received signal.

2. The method, as recited in claim 1, wherein generating the DC offset compensation signal further comprises:
   generating a first frequency correction value by integrating a complex exponential frequency correction signal over the first interval of valid data of the first symbol time; and
   generating a second frequency correction value by integrating the complex exponential frequency correction signal over the second interval of valid data of the second symbol time.

3. The method, as recited in claim 2, wherein generating the DC offset compensation signal further comprises:
   generating the complex exponential frequency correction signal based on a real-valued signal and the frequency offset indication signal.

4. The method, as recited in claim 3, wherein generating the complex exponential frequency correction signal includes using a Coordinate Rotation DIgital Computer (CORDIC) responsive to the real-valued signal and the frequency offset indication signal.

5. The method, as recited in claim 2, wherein the DC offset compensation signal is further generated based on the first and second frequency correction values.

6. The method, as recited in claim 2, wherein generating the DC offset compensation signal further comprises:

generating the DC offset compensation signal based on a quotient of a difference between the first and second received signal measurements divided by a difference between the first and second frequency correction values; and integrating the quotient over multiple symbol times to generate the DC offset compensation signal.

7. The method, as recited in claim 1, wherein the frequency offset-compensated received signal is a baseband version of a radio-frequency received signal and the method further comprises recovering a data symbol from the frequency offset-compensated received signal.

8. The method, as recited in claim 1, wherein the frequency offset-compensated received signal is generated using a first Coordinate Rotation DIgital Computer (CORDIC) responsive to the DC offset-compensated received symbol and the frequency offset indication signal, and the DC offset compensation signal is generated using a second CORDIC responsive to the frequency offset indication signal and a real-valued signal.

9. The method, as recited in claim 1, wherein generating the compensated received symbol comprises:

summing the DC offset compensation signal and the received signal to generate the DC offset-compensated received symbol, wherein the frequency offset-compensated received symbol is generated based on the frequency offset indication signal and the DC offset-compensated received symbol.

10. A receiver comprising:

a DC offset compensation signal generator configured to generate a DC offset compensation signal based on a frequency offset-compensated received signal and a frequency offset indication signal, the DC offset compensation signal generator comprising:

a first accumulator configured to generate a first frequency correction value based on samples of a complex exponential frequency correction signal corresponding to a first symbol time, and further configured to generate a second frequency correction value based on samples of the complex exponential frequency correction signal corresponding to a second symbol time; and a DC offset compensation module configured to generate a DC offset-compensated received signal based on the DC offset compensation signal and a received signal.

11. The receiver, as recited in claim 10, wherein the DC offset compensation signal generator comprises:

a second accumulator configured to generate a first received signal measurement based on valid samples of the received signal received during the first symbol time, and further configured to generate a second received signal measurement based on valid samples of the received signal received during the second symbol time.

12. The receiver, as recited in claim 11, wherein the DC offset compensation signal generator further comprises:

a calculation module configured to generate a quotient of a difference between the first and second received signal measurements divided by a difference between the first and second frequency correction values; and a third accumulator configured to generate the DC offset compensation signal based on successive values of the quotient.

13. The receiver, as recited in claim 11, wherein the DC offset compensation signal generator further comprises:

a Coordinate Rotation DIgital Computer (CORDIC) configured to generate the complex exponential frequency correction signal based on a real-valued signal and the frequency offset indication signal.

14. The receiver, as recited in claim 10, wherein the receiver further comprises:

a Coordinate Rotation DIgital Computer (CORDIC) configured to generate the frequency offset-compensated received signal based on the DC offset-compensated received signal and the frequency offset indication signal.

15. The receiver, as recited in claim 10, wherein the receiver is a zero-IF receiver and further comprises:

a radio-frequency receiver interface configured to frequency mix a received radio-frequency signal directly to baseband.

16. The receiver, as recited in claim 10, further comprising:

a symbol timing module configured to determine valid samples of a symbol of the frequency offset-compensated received signal; and an orthogonal frequency-division multiplexing demodulator configured to recover data from the valid samples.

17. An apparatus comprising:

means for generating a first received signal measurement by integrating valid samples of a frequency offset-compensated received signal over a first interval of valid data of a first symbol time and for generating a second received signal measurement by integrating valid samples of the frequency offset-compensated received signal over a second interval of valid data of a second symbol time;

means for generating a first frequency correction value by integrating a complex exponential frequency correction signal over the first interval of valid data of the first symbol time and for generating a second frequency correction value by integrating the complex exponential frequency correction signal over the second interval of valid data of the second symbol time;

means for generating a DC offset compensation signal based on the frequency offset-compensated received signal, a frequency offset indication signal, the first received signal measurement, the second received signal measurement, the first frequency correction value, and the second frequency correction value; and means for recovering data from the received signal based on the DC offset compensation signal, the frequency offset indication signal, and a received signal.

18. The apparatus, as recited in claim 17, wherein the means for generating the DC offset compensation signal comprises:

means for generating a complex exponential frequency correction signal based on a real-valued signal and the frequency offset indication signal.

* * * * *